United States Patent Office 2,927,057
Patented Mar. 1, 1960

2,927,057
OLIGOMYCIN AND PROCESS OF PREPARING THE SAME

Elizabeth F. McCoy and William H. Peterson, Madison, Wis., assignors to Wisconsin Alumni Research Foundation, Madison, Wis., a corporation of Wisconsin No Drawing. Application July 15, 1955
Serial No. 522,380

4 Claims. (Cl. 167—65)

The present invention relates to the antibiotic field and specifically to novel compositions containing the new antifungal antibiotic, oligomycin, and improved processes of preparing the same. A description of the antibiotic appears in the thesis of Robert M. Smith entitled, "Biological and Chemical Studies on a New Antibiotic Oligomycin," University of Wisconsin (1953) and in the Smith, Robert M., Peterson, William H., and McCoy, Elizabeth, publication in Antibiotics and Chemotherapy, vol. IV, No. 9, pages 962–970 (1954). See also the theses of Jeronimo Visser, "Improvements in the Production and Isolation of Oligomycin"; William J. Halliday, "Further Studies of the Preparation and Properties of Oligomycin"; and Edward W. Marty, "New Antibiotics Active against *Pythium debaryanum* Hesse," all of the University of Wisconsin (1955).

With the remarkable successes in the use of antibiotics in the control of bacteria, there has been an increase in interest in the search for antifungal antibiotics. A number have been reported in the literature of which antimycin, fungistatin, helixin and mycosubtilin are illustrative. These materials have been demonstrated to be effective against certain fungi as well as certain bacteria.

The antibiotic of the present invention, oligomycin, is antifungal in character and as far as known has no effect on bacteria. In this characteristic as well as other properties, it is believed to differ from any previously reported antibiotic.

Oligomycin was originally prepared by fermentation in an aqueous nutrient medium comprising essentially glucose, soybean meal (or flakes), corn steep liquor, salt (NaCl) and calcium carbonate. After 4–6 days' incubation, the fermented broth was filtered and the solid material (mycelium cells, etc.) discarded. The clarified broth was then adjusted to pH 2 with acid and the precipitate which formed collected and extracted with ethyl acetate to yield a crude oligomycin concentrate. See the Smith thesis and Antibiotics and Chemotherapy, supra. While this process provided a crude product from which pure crystalline oligomycin could be obtained, it possessed disadvantages for large scale commercial operations due to low yields and the inherent problems encountered in recovery of a relatively small amount of solid material from large volumes of liquor.

In attempts to solve these problems, research investigations were continued and it was discovered that yields of oligomycin could be improved by use of glycerol in the fermentation broth. Later it was discovered that fatty oils (liquid glycerides of fatty acids) could be employed in place of glycerol and that the so-called semi-synthetic mediums (see Examples I and II below) could be used to advantage in place of complex organic compositions such as soybean meal and corn steep liquor. Addition of a neutralizing agent, e.g. calcium carbonate, after about 10–30 hours when the pH of the fermenting medium has dropped, e.g. below about pH 6, also proved advantageous. It was also discovered that within the first 3–5 days of incubation in the above mediums containing excess fatty oil that substantially all of the antibiotic remained in the mycelium and that the antibiotic could be readily recovered from the mycelium. This latter discovery, i.e. the retention of the antibiotic in the mycelium (which may be due at least in part to the presence of lipids in the mycelium cells) proved of enormous importance as it avoided the problems of recovery from large volumes of broth.

The use of fatty oils is the best means for retaining the antibiotic in the mycelium. However, the oil can be replaced in whole or in part with other metabolizable carbon containing compounds, such as carbohydrates, providing the carbon source is present in sufficient amounts to prevent autolysis. With autolysis, the organism utilizes the lipids in the mycelium and in effect burns up itself. This results in the pH going up excessively and the antibiotic being released to the beer. Satisfactory carbohydrates for use in the present invention include lactose, maltose, glucose, glycerol, starch and the like. For ready control of pH, i.e. prevention of autolysis and retention of the antibiotic in the mycelium, the use of fatty oil at least as a part of the carbon source is much preferred.

The following examples will serve to illustrate the invention.

Example I

The aqueous fermentation medium was made up by weight of 0.4% $(NH_4)_2HPO_4$; 0.2% $KH_2PO_4$; 1.0% cane molasses; 0.1% $MgSo_4 \cdot 7H_2O$; and 1% w./v. of lard oil. After adjustment of the pH to 7 with sodium hydroxide, the inoculum (about 4% by volume of the fermentation medium) containing the oligomycin-producing organism (*Streptomyces diastatochromogenes*) was added and fermentation allowed to continue at 29° C. for 96 hours with continuous stirring and with aeration at the rate of about ½ vol./vol./min. At the end of 24 hours when the pH of the fermenting medium dropped to about 5.6, 0.5%, $CaCO_3$ was added. During the fermentation period 1% w./v. additional lard oil containing about 6% of a cationic surface active agent such as Alkaterge C was also added automatically to control foam formation. Oligomycin production and change in pH during fermentation were as follows:

| Time in Hours | pH | Oligomycin, µg./ml. |
|---|---|---|
| 10 | 6.6 | |
| 17 | 6.3 | |
| 24 (CaCO₃ added) | 5.6 | |
| 34 | 6.7 | 130 |
| 44 | 6.8 | 310 |
| 66 | 7.05 | 620 |
| 96 | 7.0 | 1,000 |

After completion of the incubation period (96 hours) the mycelium was recovered by filtering in a filterpress. The wet mycelium was extracted first with 100% acetone and then with 70% aqueous acetone and the combined extracts evaporated to remove the solvent. The proportions are not critical although sufficient acetone or like water-miscible solvent should be used to extract substantially all of the antibiotic. With about 25 pounds of wet mycelium, the use of sufficient solvent to form about 50 liters of extract has proven adequate. The product resulting from this process after removal of the solvent comprises essentially a mixture of the antibiotic in fatty oil. It is extremely potent and, without further purification, is eminently satisfactory for use in various fields set forth below. If desired, however, the product can be further purified by extracting with ethyl acetate, removing the solvent, addition of the resulting sirupy liquid to a light petroleum hydrocarbon (Skellysolve B), recovering the resulting oligomycin precipitate (preferably with a filteraid (Celite), slurrying the oligomycin-containing solid in ethanol, addition of activated carbon (Darco G60), filtering to remove the filteraid and carbon, heating the resulting clear oligomycin-ethanol solution to about 40° C., adding water to provide a 70–80% alcohol mixture, allowing the mixture to cool slowly and recovering the resulting crystalline oligomycin precipitate. See the Visser thesis, supra. Other purification procedures are described in the Smith thesis and Antibiotics and Chemotherapy, supra.

*Example II*

Another method of producing oligomycin by harvesting the cells at a time when practically all of the antibiotic is in the cells is as follows: 100 liters of medium containing, gm. per liter, glycerol, 20; $(NH_4)_2HPO_4$, 4; $K_2HPO_4$, 2; $MgSO_4 \cdot 7H_2O$, 1; $CaCl_2 \cdot 2H_2O$, 0.4; $FeSO_4 \cdot 7H_2O$, 0.02; $MnSO_4 \cdot 4H_2O$, 0.01; distilled water to make 1 liter were sterilized in a 50 gallon tank and inoculated with a culture of oligomycin the *S. diastatochromogenes*. The inoculum was prepared by transferring spores into the fermentation medium but containing in addition 0.5 percent yeast extract, incubating and aerating at 30° C. for 24 hours. This inoculum was used at the rate of about 4 percent by volume of the fermentation medium. The medium was maintained at 30° C., agitated by an impeller run at 120 r.p.m. and aerated through a sparger at the rate of 1.5 cu. ft. of air per minute. Foaming was controlled by the automatic addition of lard oil (1–2% w./v.) containing about 6 percent of a surface active agent (Alkaterge C).

When the oligomycin potency amounted to about 120 micrograms in the cells per ml. of broth and about 5 mcg. per ml. in the cell-free medium (3–5 days), the run was harvested. The cells were allowed to settle and the main part of the supernate was discarded. A filter aid (Filtercel 10 gm. per liter of the original volume) was added to the cell suspension and the suspension was filtered. The filter cake was extracted with ethyl acetate in successive portions until about one-tenth of the original volume of fermented medium had been obtained. The extract contained the oligomycin and oil. The oligomycin was obtained by removing the ethyl acetate, extracting the residue with a hydrocarbon (Skellysolve) and crystallizing the oligomycin from methanol-water.

Where a product low in oil is desired, the process described in Example I is preferred in that extraction with aqueous acetone or like water-miscible solvent in which the antibiotic is soluble, removes the antibiotic from the mycelium-oil mixture and, compared to the use of ethyl acetate or like substantially water-immiscible solvent, as in Example II, removes only a relatively small amount of the fatty oil. Ordinarily the fatty oil content may vary from about 10–50% by weight of the solids extracted depending on the amount of oil employed in the fermentation, the lipid content in the cells and the particular solvent employed for extraction. In all extractions, from the mycelium, however, the antibiotic is removed with some fatty oil and it is this mixture which is particularly adaptable for use as described below.

*Example III*

This example follows the general procedure employed in Example I up to the extraction step with acetone. The wet mycelium recovered by filtering in a filterpress is dried and then ground up into finely divided or powdered form. This product mae up of mycelium an oil (including the lipids in the mycelium cells) contains about 5–10% by weight of active antibiotic materials and also can be used as such without extraction with organic solvents for various purposes detailed below.

In the fermentation processes described in the above examples, in place of an animal fatty oil such as lard oil, vegetable oils such as peanut oil and the like can also be employed. The fatty oil when employed during fermentation should be present in about at least 0.5% w./v. and should, of course, be liquid at the fermentation temperatures carried out around 30° C.

In the recovery process described in Examples I and II, in place of acetone, other water miscible or partially miscible organic solvents such as methanol, ethanol, propanol and butanol can be employed, and in place of ethyl acetate, other water immiscible organic solvents such as ethyl ether, propylene glycol and chloroform can be employed.

The products of the present invention made up of the antibiotic and with or without fatty oil can be dispersed in kerosene and the like, or water, preferably with a surface active or emulsifying agent, and be applied both as an antifungal agent and an insecticide. In addition to inhibiting many fungi (see the Antibiotics and Chemotherapy and Halliday, supra), the compositions of the present invention can be used to kill ants, beetles, etc. as well as nematodes. One of the preferred compositions for use, for example, in an aerosol dispenser is made by dissolving the antibiotic-fatty oil combination in xylene or benzene and then emulsifying the solution in an aqueous medium containing a small amount of Freon and a surface active agent such as sodium dodecyl phenyl sulfonate to provide a final composition containing about 0.01–0.1% by weight of antibiotic. Alcohol solutions can also be employed, an aqueous-ethanol solution containing about 0.01–0.05% by weight of antibiotic being one of the preferred for killing nematodes, e.g. *Rhabditis briggsae*. The compositions of the present invention can also be mixed with solid insecticide type carriers, e.g. talc and the like, and be applied in dust form. A mixture made up of a major proportion of clay and a minor proportion of powdered mycelium prepared in accordance with Example III is an illustrative example. Generally, the final compositions (liquid or solid) contain 0.001–1.0% by weight of the antibiotic active ingredients. Concentrates containing various amounts of antibiotic and oil can readily be prepared for mixing with various liquid and solid diluents in the same manner D.D.T. is dispensed and applied. The compositions of the present invention can also be used to treat seeds subject to fungi. They are particularly adaptable for this purpose as they have been found not to adversely affect the germination of seeds. Their application to the soil to control fungi or kill nematodes has also proven advantageous in that the compositions of the present invention do not deleteriously affect beneficial bacteria in the soil.

A culture of the oligomycin producing organism, *Streptomyces diastatochromogenes*, described above, has been deposited with the U.S. Department of Agriculture, Northern Utilization Research and Development Division at Peoria, Illinois, and has been assigned the numerical designation NRRL 2772.

We claim:

1. The improved process of producing the antibiotic oligomycin which comprises growing the oligomycin-producing *Streptomyces diastatochromogenes* (NRRL 2772) in an aqueous nutrient broth containing excess lard oil at a temperature of about 30° C. for about 3–5 days, adding calcium carbonate when the pH of the broth drops below about pH 6, and separating the mycelium formed in the broth along with oil remaining in the broth from the resulting fermentation broth.

2. The process of recovering the antibiotic oligomycin from mycelium in a fatty oil containing aqueous fermentation broth which comprises separating the mycelium along with oil from the aqueous broth, and recovering the antibiotic along with oil by extracting the mycelium-oil mixture with an organic solvent.

3. The process of claim 2 where the fatty oil is lard oil and organic solvent is aqueous acetone.

4. The process of claim 2 where the fatty oil is lard oil and the organic solvent is ethyl acetate.

(References on following page)

References Cited in the file of this patent

UNITED STATES PATENTS 2,541,726    Trussell             Feb. 13, 1951

FOREIGN PATENTS 679,087    Great Britain        Sept. 10, 1952

OTHER REFERENCES

Smith: University of Wisconsin, thesis entitled Biological and Chemical Studies on a New Antibiotic Oligomycin, January 23, 1953, pp. 12–20, 32, 33.

Smith et al.: Antibiotics and Chemotherapy, vol. IV, No. 9, 1954, pp. 962–970.

Ball et al.: Jour. Gen. Microbiology, 17, 1957, pp. 96–103 (167–Ab Polyunsat).

Umezawa et al.: The Journal of Antibiotics, Ser. A., January 1958, pp. 26–29.